April 25, 1967 H. FEICHTINGER 3,315,529
METHOD AND APPARATUS FOR TAKING SAMPLES FROM MELTS IN ORDER
TO OBTAIN THE GASES EVOLVED DURING SOLIDIFICATION
Filed Dec. 16, 1964 3 Sheets-Sheet 1
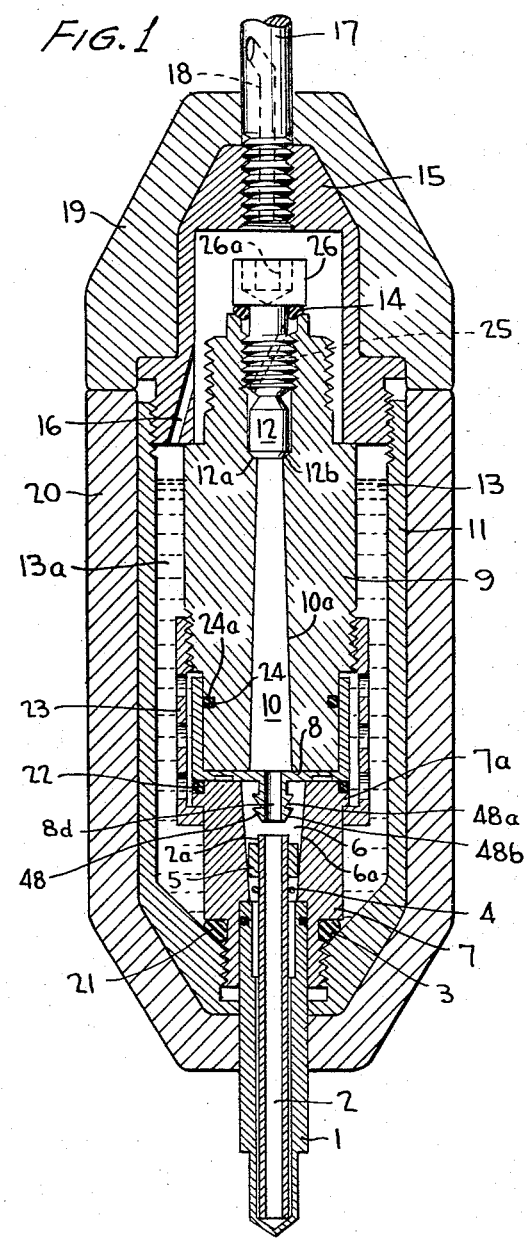
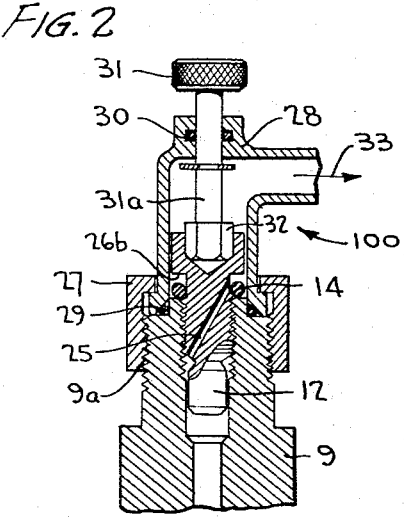
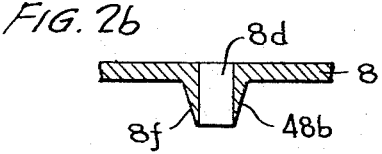
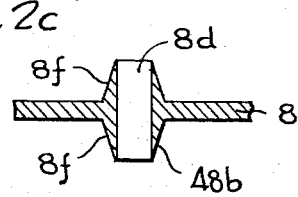
INVENTOR,
HEINRICH FEICHTINGER
BY Jacobi & Davidson
ATTORNEYS April 25, 1967 H. FEICHTINGER 3,315,529
METHOD AND APPARATUS FOR TAKING SAMPLES FROM MELTS IN ORDER
TO OBTAIN THE GASES EVOLVED DURING SOLIDIFICATION
Filed Dec. 16, 1964 3 Sheets-Sheet 2
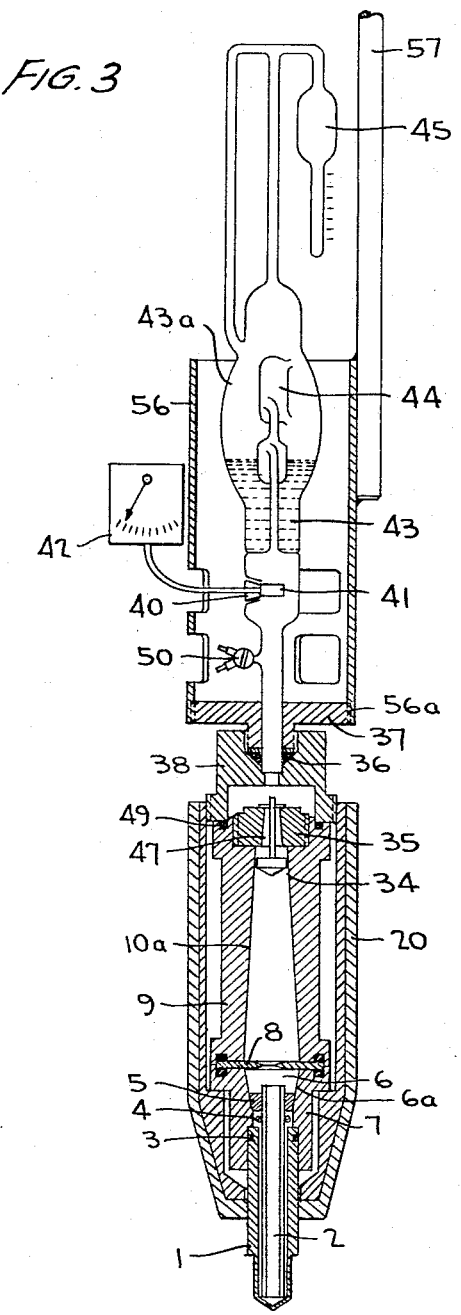
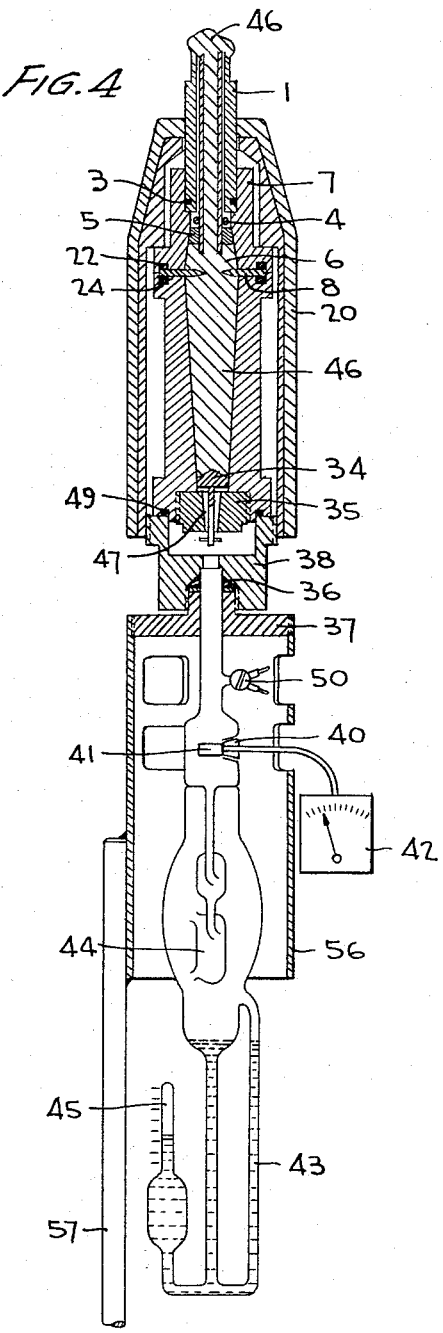
INVENTOR,
HEINRICH FEICHTINGER
BY Jacobi & Davidson
ATTORNEYS

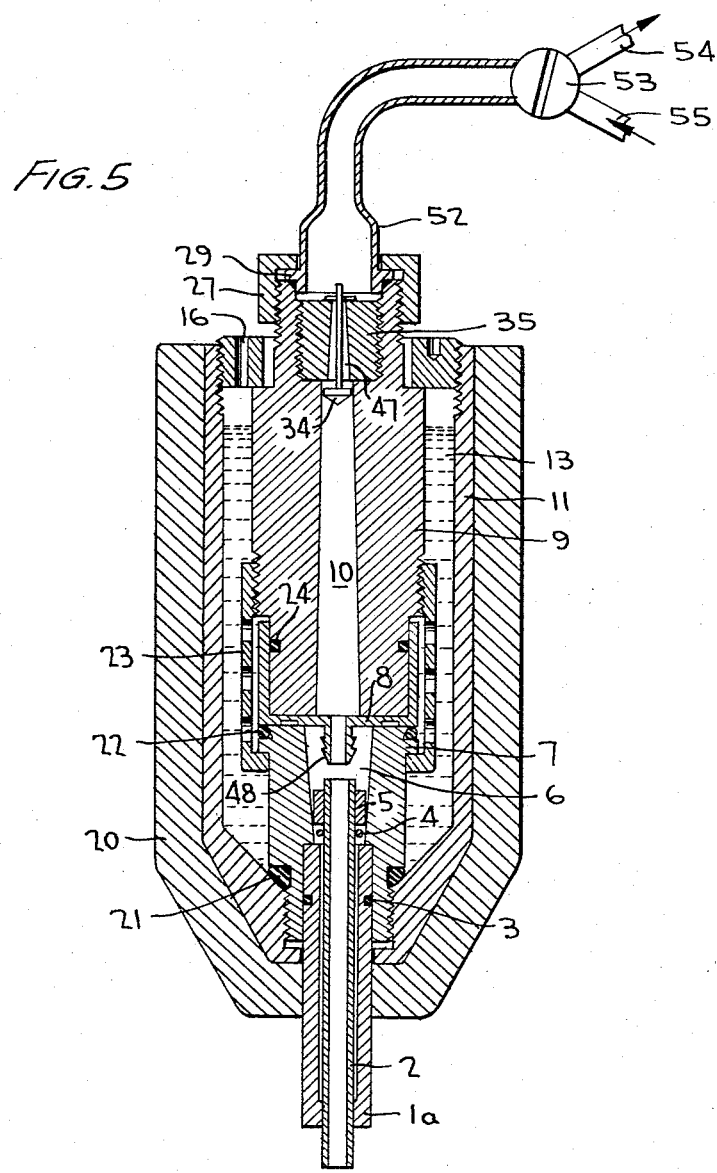

United States Patent Office 3,315,529
Patented Apr. 25, 1967

3,315,529
METHOD AND APPARATUS FOR TAKING SAMPLES FROM MELTS IN ORDER TO OBTAIN THE GASES EVOLVED DURING SOLIDIFICATION
Heinrich Feichtinger, Holzbrunnenstrasse 22, Schaffhausen, Switzerland
Filed Dec. 16, 1964, Ser. No. 418,755
Claims priority, application Switzerland, Dec. 20, 1963, 15,569/63
20 Claims. (Cl. 73—421.5)

The present invention has reference to an improved method for taking samples from liquid melts whereby the gases issuing during solidification of the melt sample can be quantitatively entrapped, as well as to an improved apparatus for carrying out the aforesaid method.

There are already known to the art techniques where steel is sucked into evacuated glass or quartz tubes which, by way of example, possess an iron head or tip sealed to these tubes. As it is submerged in the melt this head is fused through so that the melt can enter the glass or quartz tube. As soon as such tubes, generally referred to as pipettes, are filled with solidifying liquid metal they are usually dipped into cold water for purposes of chilling. Afterwards, the metal samples obtained in this manner are stored in liquid nitrogen, in order to prevent the loss of hydrogen which might occur in the period of time after solidification and before introduction of the sample to a gas analyzer.

However, such known procedures and the apparatus for implementing the same are not suitable for the checking of gases which evolve during solidification, because after the sampling operation the glass tube regularly bursts and the quartz tube most of the time. Consequently, the portion of the apparatus where material is sucked-in is not sealed from the outside or ambient atmosphere.

Additionally, to the prior art there belongs Swiss Patent 357,565 which provides a teaching for sucking the melt into a metallic body of the mold through a fusible tip. The thus obtained smooth-surface, precision-casted samples are introduced to a vacuum fusion apparatus for gas analysis. However, the checking of gases which have evolved during solidification is not possible with such an apparatus. Notwithstanding the strong chilling effect of such mold these gases are only obtained to a certain extent.

Accordingly, a primary object of the present invention is to provide an improved method and apparatus for taking samples from melts in order to positively obtain the gases evolved during solidification, so that such gases can be analyzed with a high degree of accuracy.

A further important object of this invention relates to the provision of an improved method and apparatus enabling the gases freed during solidification of a melt to be effectively entrapped without contamination by the surrounding atmosphere, so that the entrapped gases can be subsequently analyzed to provide a highly reliable and exact analysis of the entrapped gases.

Still another extremely important object of this invention has reference to an improved method and apparatus for trapping gases issuing from a sample of a melt during its solidification, while avoiding the disadvantages generally present when using glass or quartz pipettes, and further, relates to an apparatus which can reliably be used for any desired number of samplings, and immediately after taking of the sample and by using a measuring device it is possible to check the gases which have evolved during solidification.

According to the invention the melt which is to be tested is sucked through a conduit into an inner chamber of a mold. The apparatus is advantageously constructed such that this melt in moving towards the aforesaid inner chamber must first pass a preliminary chamber or ante-chamber as well as a disk member, the latter being tightly connected or sealed with the body of the mold. During solidification the melt in the preliminary chamber and the melt in the inner chamber forms with the aid of the disk member an absolutely tight seal. As a result, the gases which have evolved in the inner chamber during solidification of the melt are hindered from escaping in the direction from where the melt was sucked into the mold. As a next step all of the gases which were collected in the inner chamber and appearing between the wall of the mold and the contracted, solidified melt are then conveyed to a suitable measuring instrument by passing a closure element or mechanism. At the measuring instrument such gases can be checked qualitatively and/or quantitatively, depending upon the type of measuring instrument used. It is to be understood that this closure element may, for example, embody either a screw valve or a back-pressure valve, which after solidification of the melt can be manually opened or automatically opens.

According to an important aspect of the present invention the closure element is constructed such that it may be opened to an evacuated conduit without the entry of any outside air. In this way, it is possible to quantitatively determine the gases streaming-off by way of the closure element. In the case where such closure element is designed as a back-pressure valve the gases are directly brought into communication with a vacuum measuring instrument.

Generally speaking the inventive method for taking samples from liquid melts in order to quantitatively recover all gases evolved when the melt sample solidifies, comprises the steps of conducting the melt sample into an ante-chamber of a mold, passing said melt sample from said ante-chamber through a narrow location provided internally of the mold into an inner compartment of the mold, said inner compartment being sealed by a closure element, allowing the melt sample within said ante-chamber and inner compartment to solidify, thereby forming a tight seal at the region of said narrow location to prevent any backflow of gases evolved during solidification in a direction opposite the direction of conducting the melt sample into said ante-chamber, collecting gases evolved during solidification of the melt sample in the inner compartment of the mold, and withdrawing the collected gases from said inner compartment of the mold via the closure element, so that the withdrawn gases can be checked.

Other features, objects and advantages of the invention will become apparent by reference to the following detailed description and drawings, wherein like reference characters have been used throughout the various embodiments for the same or analogous elements, and in which:

FIGURE 1 illustrates a first embodiment of inventive apparatus for collecting the gases evolved during solidification of a sample of a melt in a mold designed according to the invention, and wherein the evolved gases are conveyed for purposes of analysis through the agency of a specially designed manually operated screw valve;

FIGURE 2 depicts details of a device which can be connected to the mold of the inventive apparatus of FIGURE 1 in order to open and close the valve of such mold under vacuum;

FIGURES 2a, 2b and 2c are respective fragmentary views depicting different possible physical structures of the narrow inlet passage for the melt at the disk member mounted between the two mold parts;

FIGURE 3 illustrates a modified form of inventive apparatus employing a mold provided with a closure element designed as a back-pressure valve which will open automatically during solidification of the melt in order to communicate the evolved gases with a pressure measuring device which is directly connected to the inventive apparatus;

FIGURE 4 depicts the apparatus of FIGURE 3 at a time after a sample of the melt has been taken; and FIGURE 5 illustrates a further embodiment of inventive apparatus using an open fusible tip.

It will be understood that the inventive apparatus depicted in FIGURE 1 enables absolute gas determination for a melt. The apparatus of the invention comprises a fusible tip 1 capable of being submerged into the melt from which a sample it to be taken. Internally of the fusible tip 1 there is arranged a hollow guide tube 2 through which the sample can pass.

An elastic rubber seal 3 is arranged between the upper end of the fusible tip 1 and a lower mold portion 7, in order to tightly embed such fusible tip 1 in the mold portion 7. Additionally, a steel retaining ring 4 is carried by the guide tube 2, above which there is arranged a ring 5. It will be understood that the ring 5 which is situated between the guide tube 2 and the body of the mold portion 7 prevents backflow of melt towards the steel retaining ring 4 and the rubber seal 3. The ring 5 is preferably formed of a material which, on the one hand, is easily fused and, on the other hand, in heated condition possesses a deoxidizing effect towards air. By way of example, aluminium has proved to be a suitable material for ring 5 when working with liquid steel melts. The sealing effect and the prevention of entry of melt brought about by the ring 5 is so complete that the rubber seal 3 after the taking of a sample can again be used for further operations.

The upper end 2a of the guide tube 2 communicates with a preliminary chamber or ante-chamber 6 defined by a bore 6a provided at the lower mold portion 7 of the mold. The melt in the ante-chamber 6 will then pass a disk member 8 provided with a throughpassage opening 8d for the melt sample and provides a narrow or restricted location, in order to fill the inner chamber or compartment 10 of the upper portion 9 of the mold. A bore 10a open at both ends of the mold portion 9 defines the inner compartment 10, and this mold portion 9 determines the form of the sample.

It will further be appreciated that the mold portions 9 and 10 collectively build the mold. At the upper end of the mold portion or part 9 there is provided a closing mechanism or element, which in the present case embodies a manually operated screw valve 26. During such time as the sample of the melt is sucked into the inner chamber 10 this screw valve 26 assumes the closed position depicted in FIGURE 1, where its valve portion 12 is seated at 12a upon the correspondingly formed valve seat 12b provided at the upper portion 9 of the mold 7, 9. Consequently, the melt is prevented from flowing further upwards due to the closed screw valve 26.

It shall be understood that the melt within the mold 9, 10 solidifies, in so doing tightly closes around the disk member 8 or will weld itself thereto, particularly if such disk member possesses sharp edges 48a at the narrow inlet location 48. In FIGURES 2a, 2b and 2c there are illustrated, by way of example, a number of different possibilities for providing such sharp edges to enhance sealing or welding of the solidified melt to the disk member 8. Thus, in FIGURE 2a the melt throughpassage opening 8d of the disk member 8 is provided with sharp edges 8c which are formed by conically inwardly tapering the wall 8c of the aforesaid opening 8d from opposite faces of said disk member. In FIGURE 2b there is provided a truncated cone-like projection 8f at one face of the disk member 8 and at which there is formed the infeed opening 8d. FIGURE 2c is a variant of the arrangement of FIGURE 2b, showing two cone-line projections 8f provided at opposite faces of the disk member 8.

Additionally, it is possible to cover the disk member 8 at location 48 with an easily fusible covering material, generally designated at 48b, which will cause soldering or welding of the sucked-in melt to this disk member. For example, it has proved to be advantageous to use disks made of iron which were covered at location 48 with tin for the sampling of steel melts. When taking samples of copper or bronze melts, fusible tips 1 formed of aluminum and disks 8 formed of copper with a tin covering provided at location 48 have proven to be advantageous. Furthermore, when taking samples from silver melts disks 8 formed of silver with a silver solder covering provided at location 48 have proved favorable. Moreover, such covering 48b may also be a non-gassing fluxing agent, zinc chlorite for instance.

Upon further inspecting FIGURE 1 it will be seen that the upper end of the lower mold portion 7 is provided with shoulder means 7a for supporting an elastic sealing ring 22 bearing against the disk member 8. The mold portion or part 9 is provided with a ring-shaped recess 24a upon which is seated an elastic sealing ring 24. These elastic sealing rings 22 and 24 serve to tightly or sealingly connect the disk member 8 with the mold portions 7 and 9. These mold portions 7 and 9, in turn, are held together by means of a suitable screw connection 23. The lower region of the mold portion 7 bears against a jacket or sleeve member 11 through the agency of a sealing ring 21.

It will further be appreciated that chilling of the melt as well as also cooling of the sealing rings 21, 22 and 24 is effected by using a liquid or vaporizing cooling agent 13, and with lower temperatures a solidified cooling agent. This cooling agent 13 is contained in a compartment 13a formed by the mold 7, 9 and the protective jacket 11. The screw connection 23 has parts 23a through which the cooling agent or medium can move to thereby act upon the disk member 8 and seals 22, 24. Suitable illustrative examples of cooling agents are water, water with additives, carbontetrachloride, alcohol and similar liquids. The protective jacket or sleeve 11 is protected against attack by the melt by means of a protective covering or casing 20 formed of asbestos, paper, chamotte and so forth.

The mold 7, 9 itself is held in place by a screw cap 15 housed within a protective sleeve or cover member 19. The entire aforedescribed arrangement can be conveniently handled by means of a rod 17, the length of which is adapted to the melting unit from which it is desired to take a sample, so that the mold can be submerged in the melt. It will be seen that this handle or rod 17 which piercingly extends through the screw cap 15 and the protective jacket 19 is provided with a bore 18 so that any vapors which might form from the cooling agent 13 can escape to the outside via a port or hole 16 provided at the screw cap 15 and the aforesaid bore 18.

Directing attention now to FIGURE 2 it will be seen that there is illustrated the details of the screw valve 26 as well as device 100 for actuating this valve in order to evacuate and convey away the gases contained in the mold 7, 9 which have evolved during solidification of the melt sample. It will be seen that such device 100 embodies a threaded sleeve 27 adapted to be threaded onto the upper threaded end 9a of the mold portion 9. This threaded sleeve 27 supports a vacuum conduit 28 bearing against a sealing ring 29. Threaded sleeve 27 permits connecting the vacuum conduit 28 via the sealing ring 29 with the mold portion 9 in a tight manner, so that none of the gases collected in the inner compartment 10 can escape to the outside, and vice versa. Moreover, the vacuum conduit 28 supports a valve-actuating or control member 31a which is provided at one end with an engaging head portion 32 constructed to fit into a bore 26a located at the upper end of the screw valve 26. This valve-actuating member 31a is provided at the other end with a knurled knob 31 facilitating rotation of the control or actuating member 31a, so that the screw valve 26 can be selectively opened and closed under the exclusion of air.

It will be understood that when this valve 26 is opened, as shown in FIGURE 2, the inner compartment 10 of the mold 7, 9 can be emptied via a channel or bore 25 provided at the body of the aforesaid valve 26. Afterwards, closing of the mold 7, 9 can be achieved by simply rotating the screw valve 26 by means of the control member 31a, the mold being closed under vacuum by means of an elastic seal 14 disposed between the upper end of the mold portion 9 and the bottom face 26b of the upper end of the screw valve 26. It should now be apparent that the screw valve 26 is designed such that in closed condition there exists both a metallic sealing of the compartment 10 by parts 12a, 12b and a further sealing by means of the elastic seal 14 disposed between the upper end of the valve 26 and the mold portion 9.

The function of the apparatus depicted in FIGURES 1 and 2 for absolute gas determination will now be briefly considered. Let it be assumed that the device 100 of FIGURE 2 was connected to the upper threaded end 9a of the mold portion 9 and the interior of the mold 7, 9 evacuated via the open screw valve 26 and the vacuum conduit 28. Thereafter, the screw valve 12 is closed, the evacuation device 100 removed and replaced by the screw cap 15 and protective jacket 19. The apparatus of FIGURE 1 is then grasped by the rod 17 and dipped into the melt from which a sample is to be taken. In so doing, the fusible tip 1 which is submerged in the melt is fused through at the bottom so that the melt can enter the preliminary chamber 6, then through the disk member 8 and finally into the inner compartment 10. The submerging time is approximately ½ to 1 second, during which filling and solidification will take place in the same way independent of the submerging time. The solidifying melt contracts and, in so doing, closes tightly around or welds itself to the disk member 8. Consequently, none of the gases evolved during solidification and trapped in the compartment 10 can move downwardly in the direction from which the melt entered the aforesaid compartment. It further is to be recalled that the upper end of the mold is tightly sealed by the screw valve 26. Hence, the evolved gases are positively trapped in the compartment 10. Now, the screw cap 15 and the protective jacket 19 can again be removed and the evacuation device 100 of FIGURE 2 connected to the mold portion 9, the screw valve 26 opened and the contained gases conducted via the vacuum conduit 28 leading to a suitable measuring device enabling appropriate analysis of the evolved gases. Such a measuring device may be of the type depicted in the embodiment of FIGURES 3 and 4 permitting of quantitative and qualitative gas analysis, or any other suitably known measuring device selected in accordance with the type of analysis to be performed with the trapped gas.

In FIGURES 3 and 4 there is shown a further embodiment of inventive apparatus incorporating a mold 7, 9 for the taking of samples from a melt in order to entrap the gases evolving during solidification. It will be understood that the operation of the apparatus of FIGURES 3 and 4 is essentially similar to that of the apparatus depicted in FIGURES 1 and 2. It will also be noted that there exists a certain similarity between the physical structure of this embodiment and the previously discussed embodiment, for which reason the same reference numerals have been employed for substantially the same or analogous elements. However, in the embodiment of FIGURES 3 and 4 the manually operated valve 26 is missing and, in this case, replaced by a back-pressure valve 34 capable of being closed by the entering liquid melt and which will open as the melt solidifies and contracts.

A bore or hole 47 provided in a threaded member 35 permits communicating the gases evolved from the melt with a vacuum measuring device 45. This vacuum measuring device or instrument 45 is tightly sealed to the body of the mold portion 9 of the mold 7, 9 by means of screw connections 37, 38 and the two seals 36 and 49. Additionally, a jacket or sleeve 56 provided with a holding rod or hand rail 57 is threadably connected at 56a with the screw connection 37. This jacket or sleeve 56 serves to protect the vacuum measuring instrument 45 in the region which may be endangered by excessive heat.

As best shown in FIGURE 4, the mold is inverted after solidification of the melt, so that mercury, generally designated by reference character 43, will flow from a reservoir 43a into the McLeod-shaped vacuum measuring instrument 45. In this regard it is pointed out that the vacuum measuring instrument 45 has been equipped with a specially designed guard 44 which safeguards against backflow, so that mercury 43 cannot get into the inner chamber or compartment 10 of the mold 7, 9. It will also be seen that a pressure measuring instrument based on heat conductivity, which for example is designed in the well known manner of a thermocouple and equipped with a feeler on heat conductivity cell 41 and an indicating instrument 42 is connected to the vacuum measuring instrument 45 by means of a stopper or joint 40. It is also to be understood that the mold system can be evacuated by means of a tap 50. The apparatus depicted in FIGURE 4 renders it possible to immediately obtain information about the gases set free during solidification and cooling down of the melt after a sample has been taken. It should be evident that with this embodiment it is possible to simultaneously carry out an absolute pressure measurement as well as a measurement by means of the heat conductivity cell 41 and the indicating instrument 42.

In FIGURE 5 there is shown a further variant of the inventive apparatus which, in this case, is quite similar to the embodiment of FIGURES 3 and 4, again like reference characters have been employed for the same or substantially analogous elements. However, in this embodiment and contrary to the physical structures depicted in FIGURES 1 to 4, the fusible tip 1a is open. Consequently, just before a sample of the melt is taken, the interior of the mold 7, 9 is filled with a neutral or inert gas, argon for instance. This gas can move in the direction of the arrow 55 by turning the tap or valve 53 into a position making it possible for the argon to flow into the interior of the mold 7, 9. Then a sample is taken from the melt, at the same time evacuating the inner chamber of the mold 7, 9 by switching the tap 53 into a position to permit flow in the direction of the arrow 54. It will be appreciated that the melt which is sucked into the mold when shooting upwards will first close back-pressure valve 34, and at which time or shortly before the tap 53 is closed. The now solidifying melt opens the back-pressure valve 34 analogous to the described operation of FIGURES 3 and 4. Consequently, the gases evolved during solidification of the melt can be sucked-off by way of the tap 53 into a suitable vacuum-analytical measuring system.

It has been found in actual practice that the employed method and the apparatus for carrying out the inventive method designed according to the teachings of the invention for the taking of samples from melts in order to obtain the gases which are set free during solidification, offers a number of very considerable advantages. For example, the apparatus can be used for any desired number of samplings, and also immediately after taking the last sampling a non-skilled person can prepare the mold for the next sampling operation. Moreover, without expert handling it can be used in actual practice even under the most unfavorable conditions. It also delivers a precision-casted sample which has been obtained absolutely under the exclusion of outside air and which can be used for vacuum fusion directly without special preparation of the sample. Gases evolved from the sample during chilling are absolutely protected from any losses and can be transported or conveyed to a measuring instrument by means of a tightly sealed vacuum conduit which is directly connected to the mold. It will also be seen that the mold is surrounded by a tight double jacket which is filled with a cooling agent enabling better chilling of the solidifying melt and ensuring for good cooling of the seals between the mold body and the disk member. This is a vital condition in order to enable reliable function of high vacuum connections.

While there is shown and described present preferred embodiments of the invention it is to be distinctly understood that the invention is not limited thereto but may be otherwise variously embodied and practised within the scope of the following claims.

What is claimed is:

1. Method for taking samples from liquid melts in order to quantitatively recover all gases evolved when the melt sample solidifies, comprising the steps of: conducting the melt sample into an ante-chamber of a mold, passing said melt sample from said ante-chamber through a narrow location provided internally of the mold into an inner compartment of the mold, said inner compartment being sealed by a closure element, allowing the melt sample within said ante-chamber and inner compartment to solidify, thereby forming a tight seal at the region of said narrow location to prevent any backflow of gases evolved during solidification in a direction opposite the direction of conducting the melt sample into said ante-chamber, collecting gases evolved during solidification of the melt sample in the inner compartment of the mold, and withdrawing the collected gases from said inner compartment of the mold via the closure element, so that the withdrawn gases can be checked.

2. Method for taking samples from liquid melts as defined in claim 1 including the step of manually opening said closure element to withdraw the collected gases from said inner compartment.

3. Method for taking samples from liquid melts as defined in claim 1 including the step of automatically opening said closure element due to contraction of the melt sample in order to withdraw the collected gases from said inner compartment.

4. Method for taking samples from liquid melts as defined in claim 1 including the step of passing the collected gases withdrawn from said inner compartment to a vacuum measuring instrument.

5. Method for taking samples from liquid melts as defined in claim 1 including the step of passing the collected gases withdrawn from said inner compartment to a gas analysis apparatus where it undergoes quantitative and qualitative determination.

6. Method for taking samples from liquid melts as defined in claim 1 including the step of simultaneously performing at the withdrawn gases an absolute pressure measurement and a measurement by means of a heat conductivity cell and an indicating instrument.

7. Method for taking samples from liquid melts in order to quantitatively recover all gases evolved when the melt sample solidifies, comprising the steps of: conducting the melt sample into an ante-chamber of a mold, passing said melt sample from said ante-chamber through a narrow location provided internally of the mold into an inner compartment of the mold, said inner compartment being sealed by a closure element, allowing the melt sample within said ante-chamber and inner compartment to solidify thereby forming a tight seal at the region of said narrow location to prevent any backflow of gases evolved during solidification in a direction opposite the direction of conducting the melt sample into said ante-chamber, and collecting gases evolved during solidification of the melt sample in the inner compartment of the mold.

8. Apparatus for taking samples from liquid melts comprising a mold incorporating a pair of operatively interconnected mold portions, one such mold portion being provided with an ante-chamber and the other mold portion with an inner compartment for collecting gases evolved during solidification of the melt sample, said inner compartment being provided with a pair of openings, one of said openings communicating said inner compartment with said ante-chamber, the other of said openings communicating said inner compartment to the outside, a disk member disposed between said mold portions, said disk member having a throughpassage opening to enable flow of the melt sample from said ante-chamber to said inner compartment, and closure means for sealing said other opening.

9. Apparatus for taking samples from liquid melts as defined in claim 8 wherein said closure means is a manually actuated valve.

10. Apparatus for taking samples from liquid melts as defined in claim 8 wherein said closure means is an automatically actuated valve which automatically closes when the melt sample is drawn into said inner compartment and automatically opens when such drawn-in melt sample solidifies.

11. Apparatus for taking samples from liquid melts as defined in claim 8 including means for withdrawing the gases collected in said inner compartment, and a measuring instrument for analysing the withdrawn gases operatively connected with said withdrawing means.

12. Apparatus for taking samples from liquid melts as defined in claim 8, further including sealing means for tightly connecting said disk member to both mold portions.

13. Apparatus for taking samples from liquid melts as defined in claim 12, further including means defining a cooling compartment surrounding said mold, a cooling medium stored in said cooling compartment, said cooling medium surrounding said sealing means and said disk member.

14. Apparatus for taking samples from liquid melts as defined in claim 13, said disk member being provided with a covering formed of a material which easily fuses with at least a portion of the melt sample moving into said inner compartment.

15. Apparatus for taking samples from liquid melts as defined in claim 14, wherein said material of said covering is selected from the group comprising tin, silver solder and a non-gassing fluxing agent.

16. Apparatus for taking samples from liquid melts as defined in claim 14, wherein said cooling medium contacts said mold, said disk member and said sealing means.

17. Apparatus for taking samples from liquid melts as defined in claim 8, said closure means incorporating a valve portion, said other mold portion being provided with a valve seat cooperating with said valve portion to provide a metallic sealing effect when said closure means is in closed position, an elastic seal cooperating with said closure means and said other mold portion to provide an additional sealing effect when said closure means is in closed position.

18. Apparatus for taking samples from liquid melts as defined in claim 8 including a fusible tip, elastic sealing means for sealingly connecting said fusible tip with said one mold portion.

19. Apparatus for taking samples from liquid melts as defined in claim 18 further including a hollow guide tube inserted within said fusible tip, said guide tube including an upper end extending into said ante-chamber, a ring formed of easily fusible material supported at said upper end of said guide tube and cooperating with said one mold portion to prevent backflow of liquid melt between said guide tube and said fusible tip.

20. Apparatus for taking samples from liquid melts as defined in claim 8 wherein said disk member is provided with sharp edges at least at the region of said throughpassage opening.

References Cited by the Examiner
UNITED STATES PATENTS 2,143,982 1/1939 Hare et al. _____ 73—421.5
2,970,350 2/1961 Feichtinger.

LOUIS R. PRINCE, *Primary Examiner.*

S. C. SWISHER, *Assistant Examiner.*